Oct. 9, 1962
J. E. TOBIN
3,057,596
VALVE ASSEMBLY
Filed July 26, 1960
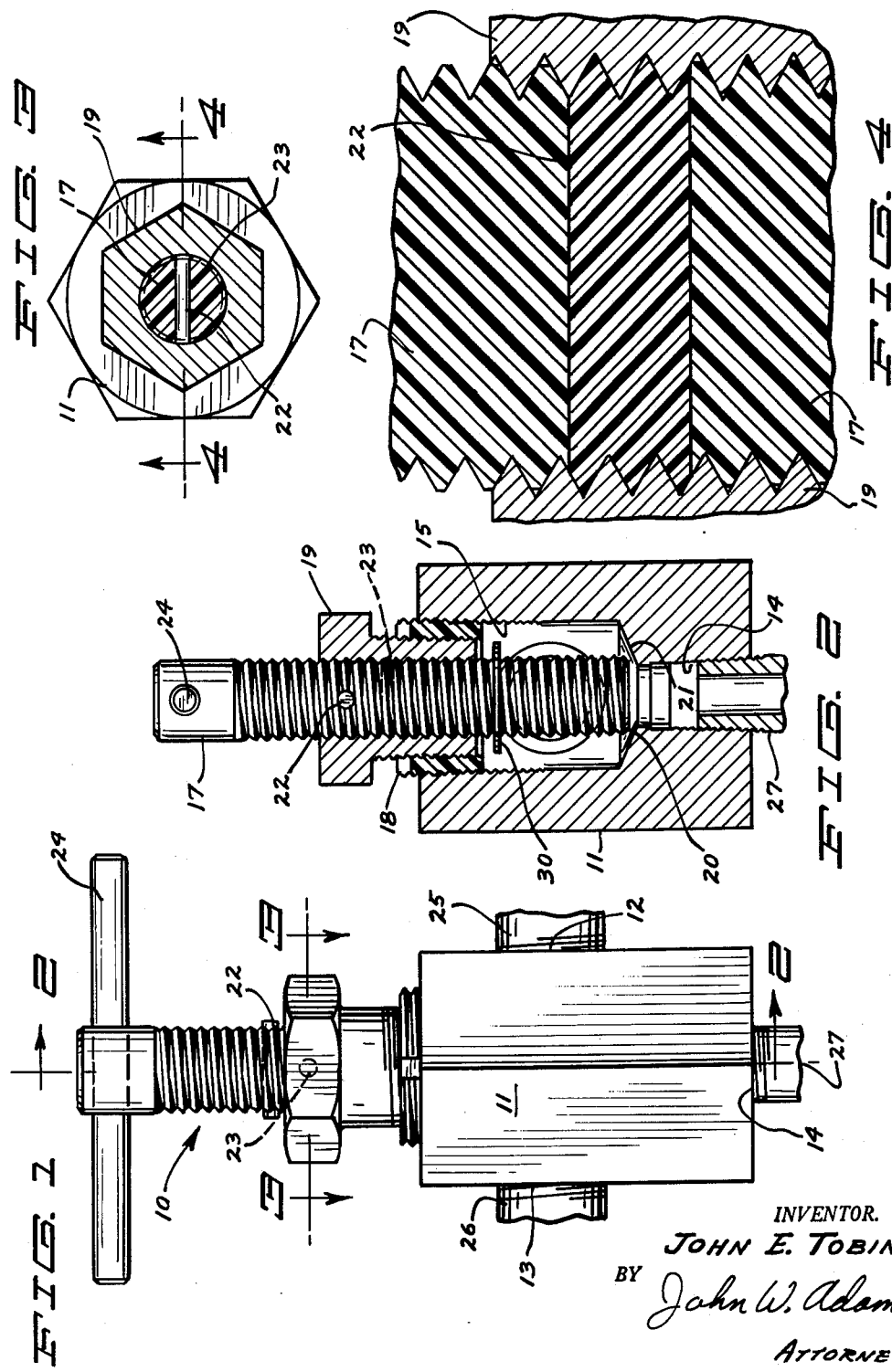
INVENTOR.
JOHN E. TOBIN
BY John W. Adams
ATTORNEY

United States Patent Office 3,057,596
Patented Oct. 9, 1962

3,057,596
VALVE ASSEMBLY
John E. Tobin, 6900 Morgan Ave. S., Minneapolis, Minn.
Filed July 26, 1960, Ser. No. 45,493
5 Claims. (Cl. 251—214)

The present invention is concerned generally with an improved seal between a tapped opening arranged to receive a threaded member in various random axial positions in combination therewith, and such a threaded member, and more particularly with an improved angle, cross valve or other modulating flow control assembly which has an improved sealing arrangement between the threaded stem portion and the tapped body portion of the valve assembly which is adapted to receive the threaded stem portion.

In the transmission and flow of fluids, particularly raw liquid resin forming materials and the like which are normally transported under pressure, complete sealing off of the operating valves normally employed in this transmission is generally a difficult problem. Packing areas and seal areas available in the currently available valves permit stagnation areas to form in these areas and along the stem where the material may harden or soldify. In addition, readily accessible means must be provided in order that certain of the valve assemblies may either be closed or disassembled when certain malfunctions occur in the line. While complex valving arrangements are normally characterized by a difficulty in removal of the stem, disk, or the like from the assembly for the normal maintenance problems and the like, the present invention provides a highly simplified sealing structure particularly adapted for valving installations which enables simple assembly and disassembly for maintenance and the like, during operation of the system. In addition, good control of fluid flow is provided by the provision of a firm mating fit between the face of the stem and the seat as arranged in the valve body.

The leaks which normally develop in the operation and use of apparatus of this type requiring seals, and particularly in valves of this type are the so-called spiral leaks which involve a flow of material along the pitch of the threads in the contact area situated between the stem potrion and the body portion. Because of the materials and appropriate machining apparatus which are currently available and in general usage, it is generally possible to prepare sufficiently close tolerance fits in mating components to eliminate any material flow which may occur directly over the apices of the contacting threads. However, it remains extremely difficult to avoid spiral leaks from developing in the preparation of matching threaded components, and particularly in valving equipment which carries this type of material at moderate pressures. The design of the present invention permits relative movement to occur relatively easily between the components of the assembly without having to overcome excessive frictional losses in moving the same.

In accordance with the present invention, at least one cylindrical plug is arranged diametrically of the threaded member or component, for example the valve stem, and arranged to be positioned or retained in the contact area between the threaded member, such as stem portion and the tapped portion, such as the valve body portion while the valve stem is in operative position relative to the valve body portion. Generally, a pair of these cylindrical plugs are arranged diametrically of the threaded component or stem at substantially right angles, one to another.

The cylindrical plugs which preferably are fabricated from a molded or extruded nylon body having a firmness substantially matching that of the stem body, have a cross-sectional dimension which exceeds 1 full thread pitch. It is generally preferable to utilize the same basic materials for the plugs as for the stem body per se, such as nylon or the like in order to match the characteristics under varying conditions.

The valve stem body also consists essentially of a semi-rigid resilient material such as molded nylon, extruded nylon or the like, the nylon preferably employing a lubricating filler such as molybdenum disulfide or the like to assist in preventing binding between the relatively movable parts. Molded nylon filled with a quantity believed to be about ½% to about 1% of molybdenum disulfide has been found suitable for this task. Such a material is nylatron GS, the code name of a suitable product marketed by the Polymer Corporation of Reading, Pennsylvania. In order to acquire a tighter fit between the edge surfaces of the nylon plug and the matching edge surface portions of the valve body, the threaded opening in the valve body is preferably of the convergently tapered type, thus enabling a progressively tighter contact surface between the cylindrical nylon body and the threaded opening in the valve body. The mating surface between the stem and the valve seat are provided by matching the contour of the face of the stem body to the contour of the seat face per se. Inasmuch as the valve stem body is fabricated from a semi-rigid but resilient material such as nylon, this material possessing the property of resisting cold-flow, a substantially uniform close tolerance fit may be achieved between the seat and the stem face.

Therefore, it is an object of the present invention to provide an improved sealing arrangement between a threaded stem means which is arranged to be threadably received within a tapped body portion, and including improved sealing means between the stem portion and the body portion.

It is a further object of the present invention to provide an improved sealing arrangement which employs at least one substantially resilient diametrically disposed cylindrical plug in a stem portion which communicates with a fluid system under pressure, the plug being semi-rigid and substantially resilient, and being arranged to be firmly received between the stem portion and a tapped portion of a body in the system.

It is yet another object of the present invention to provide an improved seal means between the stem portion and the body portion of a valve assembly, the sealing means comprising a nylon cylindrical plug arranged through the diameter of the stem and being arranged to be compressed between the oppositely disposed surfaces of the threaded opening in the valve body.

It is still another object of the present invention to provide an improved angle or cross valve which has a pair of diametrically disposed sealing plugs in the shank portion of the stem thereof, and being further characterized in that the stem portion is fabricated from a material consisting essentially of molded nylon filled with molybdenum disulfide.

Other and further objects of the present invention will become apparent to those skilled in the art upon a study of the following specification, appended claims and accompanying drawings, wherein:

FIG. 1 is a front elevational view of a valve assembly prepared in accordance with the present invention and showing the stem portion having the cylindrical plugs diametrically arranged therein as disposed prior to being received sufficiently far into the valve body in operative position within the valve body;

FIG. 2 is a side elevational view, partially in section, taken substantially along the line and in the direction of the arrows 2—2 of FIG. 1 but showing the stem as disposed when received within the valve portion in operative relationship, the face of the stem being in physical and sealing contact with the seat;

FIG. 3 is a horizontal sectional view taken along the line and in the direction of the arrows 3—3 of FIG. 1; and FIG. 4 is a vertical sectional view taken along the line and in the direction of the arrows 4—4 of FIG. 3.

In accordance with the preferred modification of the present invention an improved valve assembly generally designated 10 is shown including a body or housing member 11 having a pair of inlet or through-ports 12 and 13 together with an outlet port 14. The body portion 11 is further provided with a threaded access opening 15, this opening being adapted to receive the stem member 17 and its associated components therein. A plastic sleeve member 18 having both inner and outer threads is adapted to be inserted within the threaded opening 15 and is adapted to receive the internally and externally threaded metal sleeve member 19 therein substantially permanently sealed relationship therewith. The stem member 17 is, of course, arranged to be received along the interior of the metal sleeve member 19, the face portion 20 of the stem 17 being adapted to form a sealing or mating fit with the seat 21 of the valve body portion. Suitable mechanical means such as the rod 24 is arranged diametrically of the stem portion 17 in order to provide a means for applying rotational force for rotating the stem portion 17 to a preselected degree of opening.

Referring now to the valve or body portion 11, this body portion is fabricated from any convenient material such as aluminum, steel, plastic or the like. Generally, aluminum is preferred because of its reasonably good strength properties coupled with its ease in machining to desired tolerances. The inlet or cross-ports 12 and 13 are provided in order to receive the threaded main supply line conduits 25 and 26 therein. The outlet port 14 is likewise threaded in order to receive the threaded outlet conduit 27 therein. Thus, it will be appreciated that the valve may be positioned either in an in-line position or at the terminal portion of a main supply line and hence may conveniently function as either a cross valve, an angle valve or the like.

Referring now to the stem portion 17 and its associated components, it will be observed that the plastic sleeve member 18 is threaded all of the way into the conventionally threaded opening 15 of the valve body 11. If the body 11 is fabricated from a plastic substance, sleeve 18 would normally not be employed. The member 18 may be fabricated from any suitable semi-rigid plastic substance such as molded nylon, penton or the like and is adapted to make substantially permanent seal with the valve opening 15. Should nylon be employed as the resinous body, it is generally preferable that the member be filled with a lubricating filler such as molybdenum disulfide or the like, this filler providing a lubricated surface without suffering any loss of the physical properties of the molded nylon in order to permit periodic disassembly as required. Molded nylon filled with molybdenum disulfide is commercially available. The metal sleeve portion 19 is arranged to be received within the internal threads of the plastic sleeve member 18, the member 19 being provided with a converging internal threaded network which provides for increased compression of the cylindrical insert plugs 22 and 23 as they move into the body 11. In addition, a closer tolerance fit is achieved between the male and female portions respectively of the threads in the stem member 17 and the metallic insert member 19, thereby substantially eliminating any chance of flow to occur over the apices of the threads. In addition, it is preferred that the threaded portion of the stem 17 be cut to size so as to be snugly received between the matching internal threads of sleeve 19. In order to avoid excessive frictional forces from building up between the threads of the member 17 and the threads of the metallic sleeve 19, the apices of the male portions of the threads on the stem member 17 are not sharp, and relative movement may be accomplished between the stem and the valve body without having to overcome excessive frictional forces.

Referring now specifically to the cylindrical plug members 22 and 23, it will be observed that these members are fabricated from a semi-rigid and resilient material such as nylon, penton or the like. In addition to being readily moldable, machineable and the like, these materials are desirable from the standpoint of their property of resisting cold-flow, thereby increasing the effective lifetime of the device. The diameter of the cylindrical plugs is slightly greater than about 1 thread pitch, and preferably is about 2 thread pitches. Thus, spiral flow along the stem member 17 is substantially eliminated inasmuch as more than 1 apex or flow channel is involved. The cylindrical insert members have an original length which is preferably slightly in excess of the maximum diameter of the stem member 17. For example, a plug which is adaptable for use in combination with a ¾ inch diameter stem should have an axial length which is about 0.005 inch oversize. This provides for sufficient flow of the plug material to make the necessary seal between the stem and the opening to the valve body. Regarding plug length, the essential feature is that the length be sufficient to provide adequate deformation between the threads to form a seal. Any length greater than the pitch or mean thread diameter accordingly could reasonably be employed. When a pair of the cylindrical insert plugs are employed, the seal is virtually 100% effective for any random operational rotational position of the stem 17 relative to the body portion 11. It will be appreciated that the plastic sleeve element 18 together with the metallic insert 19 may be eliminated if desired, and the stem element 17 could reasonably fit directly into the valve body opening if such a design would be deemed advisable. Valve design, of course, would determine the advisability of such a structure. For any given valve stem material, it is generally preferable that the material of the cylindrical plug be no more rigid than that of the stem. Accordingly it will be possible to build up the desired compressional stress between the ends of the plug inserts and the interior walls of the metallic insert member 19. The bore in the stem 17 is preferably of substantially the same diameter as that of the members 22 and 23, thereby providing a substantially firm close-tolerance sliding fit between the individual components, thereby assisting in the buildup of axial stress.

In assembly, the body portion 11 is placed in the desired location in the supply lines or conduits 25 and 26. The outlet conduit 14 is attached thereto as desired. The plastic sleeve member 18 is then inserted into the valve body to the position as illustrated in FIG. 1 of the drawings and the metallic insert member 19 is screwed into the sleeve 18. The stem member having the cylindrical plugs 22 and 23 in place, and being disposed at right angles to one another, is then screwed into the metal sleeve member 19 until the face portion 20 of the stem 17 rests firmly against the seat 21 or in operative spaced relationship thereto. At this point, both of the cylindrical plug members 22 and 23 are disposed within the confines of the interiorly threaded portion of the sleeve 19 and function to seal off any tendency for spiral leaks to occur. If desired, a peripheral stop member 30 such as a split ring or the like may be disposed along the body of the stem member 17 in order to prevent complete removal of the stem 17 by merely turning the same out of the body portion.

It will be appreciated that the examples given herein are for purposes of illustration only and it will be accordingly understood that there is no intention of limiting the scope of the present invention to these illustrative examples alone, inasmuch as those persons skilled in the art may reasonably depart from these specific examples without actually departing from the spirit and scope of the present invention.

What is claimed is:

1. A valve actuator for a projectible type liquid control valve comprising, a body member having internal threads formed therein, a valve actuating stem externally threaded in a manner to cooperatively interfit with the internal threads of said body member for threadable projection therethrough, a transversely mounted sealing plug extending substantially diametrically through said stem and being somewhat longer than the pitch diameter of the stem and being fabricated from a semi-rigid resilient material resistant to cold flow and having a width greater than the pitch of the threads of said stem and said body to make sealing contact with the internal threaded walls of the body.

2. The structure set forth in claim 1 and a pair of said sealing plugs disposed in axially spaced relation through said stem to insure positive sealing.

3. The structure set forth in claim 1 and said sealing plug being made essentially of nylon material.

4. The structure set forth in claim 3 and said nylon having a lubricating filler material to facilitate rotation of the stem within said body.

5. The structure set forth in claim 4 and said filler material consisting in molybdenum disulfide.

References Cited in the file of this patent

UNITED STATES PATENTS

| | | |
|---|---|---|
| 1,774,994 | Pfouty | Sept. 2, 1930 |
| 2,373,001 | Allen | Apr. 3, 1945 |
| 2,720,845 | Whitlock | Oct. 18, 1955 |
| 2,805,040 | Voss | Sept. 3, 1957 |
| 2,833,512 | Sanborn | May 6, 1958 |
| 2,865,596 | Monnig | Dec. 23, 1958 |